United States Patent
Bolotnikov et al.

(10) Patent No.: US 11,817,744 B2
(45) Date of Patent: Nov. 14, 2023

(54) STATOR WITH A COOLING JACKET, ELECTRIC MACHINE AND MOTOR VEHICLE

(71) Applicant: Bayerische Motoren Werke Aktiengesellschaft, Munich (DE)

(72) Inventors: Felix Bolotnikov, Munich (DE); Thomas Hoefler, Groebenzell (DE); Joachim Maerz, Holzkirchen (DE); Jerome Ragot, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 588 days.

(21) Appl. No.: 16/980,916

(22) PCT Filed: Oct. 23, 2019

(86) PCT No.: PCT/EP2019/078831
§ 371 (c)(1),
(2) Date: Sep. 15, 2020

(87) PCT Pub. No.: WO2020/108876
PCT Pub. Date: Jun. 4, 2020

(65) Prior Publication Data
US 2020/0412183 A1    Dec. 31, 2020

(30) Foreign Application Priority Data
Nov. 27, 2018 (DE) .................... 10 2018 129 983.4

(51) Int. Cl.
*H02K 1/20* (2006.01)
*H02K 9/193* (2006.01)
*H02K 5/20* (2006.01)

(52) U.S. Cl.
CPC ............... *H02K 1/20* (2013.01); *H02K 5/203* (2021.01); *H02K 9/193* (2013.01)

(58) Field of Classification Search
CPC ............ H02K 1/20; H02K 5/20; H02K 5/203; H02K 9/19; H02K 9/193
See application file for complete search history.

(56) References Cited

U.S. PATENT DOCUMENTS 3,009,072 A * 11/1961 Mossay ................... H02K 1/32
                                                      310/64
2002/0047473 A1    4/2002 Laurent et al.
(Continued)

FOREIGN PATENT DOCUMENTS

CN    101087082 A    12/2007
CN    102292899 A    12/2011
(Continued)

OTHER PUBLICATIONS

Beom (WO2014051213 (A1)) English Translation (Year: 2014).*
(Continued)

*Primary Examiner* — Tulsidas C Patel
*Assistant Examiner* — Robert E Mates
(74) *Attorney, Agent, or Firm* — Crowell & Moring LLP

(57) ABSTRACT

A stator for an electric machine of a motor vehicle includes a laminated core having an inner side with winding grooves and an outer side. Windings, which are arranged in the winding grooves, form winding heads on axially opposing front faces of the laminated core. A cooling jacket conducts cooling fluid and has a first metal sheet which forms an inner wall of the cooling jacket facing the laminated core, and a second metal sheet which forms an outer wall of the cooling jacket surrounding the inner wall. An axial height of the cooling jacket exceeds an axial height of the laminated core. The cooling jacket has a laminated-core cooling jacket region for encasing the laminated core and two axially (Continued)

opposing winding-head cooling jacket regions adjoining the laminated-core cooling jacket region for encasing the winding heads.

14 Claims, 6 Drawing Sheets

(56) References Cited

U.S. PATENT DOCUMENTS

| | | |
|---|---|---|
| 2004/0080220 A1 | 4/2004 | Yamamoto et al. |
| 2007/0159022 A1* | 7/2007 | Lung ........................ F16D 1/108 |
| | | 310/216.135 |
| 2008/0223557 A1 | 9/2008 | Fulton et al. |
| 2010/0244594 A1 | 9/2010 | Murakami et al. |
| 2011/0083834 A1 | 4/2011 | Braun et al. |
| 2011/0304228 A1 | 12/2011 | Bradfield |
| 2012/0242178 A1* | 9/2012 | Miyamoto ............... H02K 3/24 |
| | | 310/54 |
| 2013/0076168 A1 | 3/2013 | Memminger et al. |
| 2014/0111043 A1 | 4/2014 | Knappenberger |
| 2016/0067763 A1* | 3/2016 | Graff ........................ B21B 1/38 |
| | | 72/364 |
| 2020/0295628 A1 | 9/2020 | Reichert et al. |

FOREIGN PATENT DOCUMENTS

| | | |
|---|---|---|
| CN | 108886301 A | 11/2018 |
| DE | 199 54 434 A1 | 5/2001 |
| DE | 10 2008 014 386 A1 | 9/2008 |
| DE | 10 2007 055 910 A1 | 4/2009 |
| DE | 10 2012 219 120 A1 | 4/2014 |
| DE | 10 2013 204 083 A1 | 9/2014 |
| DE | 10 2014 112 223 A1 | 3/2016 |
| DE | 10 2015 200 621 A1 | 7/2016 |
| DE | 10 2015 205 783 A1 | 7/2016 |
| DE | 10 2016 203 945 A1 | 9/2017 |
| DE | 10 2016 216 240 A1 | 3/2018 |
| DE | 10 2016 125 735 A1 | 6/2018 |
| DE | 10 2017 206 984 A1 | 10/2018 |
| EP | 1 564 626 B1 | 12/2010 |
| JP | 2004-148984 A | 5/2004 |
| JP | 2007-330075 A | 12/2007 |
| WO | WO 2011/154205 A2 | 12/2011 |
| WO | WO-2014051213 A1 * | 4/2014 ............... H02K 5/04 |
| WO | WO 2017/162389 A1 | 9/2017 |

OTHER PUBLICATIONS

Chinese-language Office Action issued in Chinese Application No. 201980025752.4 dated Sep. 28, 2022 with English translation (15 pages).

International Search Report (PCT/ISA/210) issued in PCT Application No. PCT/EP2019/078831 dated Jan. 16, 2020 with English translation (six (6) pages).

German-language Written Opinion (PCT/ISA/237) issued in PCT Application No. PCT/EP2019/078831 dated Jan. 16, 2020 (six (6) pages).

German-language Office Action issued in German Application No. 10 2018 129 983.4 dated Jul. 4, 2019 (six (6) pages).

* cited by examiner

STATOR WITH A COOLING JACKET, ELECTRIC MACHINE AND MOTOR VEHICLE

BACKGROUND AND SUMMARY OF THE INVENTION

The invention relates to a stator for an electric machine of a motor vehicle, which stator has a laminated core having an internal side which faces a cavity and in the circumferential direction has axially extending winding grooves, and having an external side. The stator moreover has windings which are disposed in the winding grooves and on axially opposite end sides of the laminated core configure end windings. The stator furthermore has a cooling jacket which directs a cooling fluid and has a first lamination which configures an internal wall of the cooling jacket that faces the laminated core, and a second lamination which configures an external wall of the cooling jacket that surrounds the internal wall, wherein one of the laminations is configured without a structure and the respective other lamination is structured having depressions and elevations, wherein the laminations are joined in the region of the depressions, and in the region of the elevations configure at least one cooling duct that guides the cooling fluid. The invention moreover relates to an electric machine as well as to a motor vehicle.

The focus presently is directed toward electric machines for motor vehicles, in particular electric drive machines for electric or hybrid vehicles. These machines have a stator as well as a rotor which is mounted so as to be rotatable in relation to the stator. The stator usually has a hollow-cylindrical laminated core, winding grooves having windings being disposed on the internal side of the hollow-cylindrical laminated core. The windings on axially opposite end sides of the laminated core configure end windings. The electric machine heats up during the operation of the electric machine, on account of which the output of the latter may be reduced. Overheating of the electric machine can even lead to a breakdown of the electric machine.

It is therefore known from the prior art for the stator of the electric machine to be cooled. To this end, DE 10 2007 055 910 A1 describes a cooling jacket for bearing on a stator of an electric machine. The cooling jacket has an internal wall and an external wall. The internal wall herein is configured with a smooth or a largely smoothed external side for bearing tightly on the stator. The internal wall and the external wall are permanently connected by way of individual joints and/or elongate joining portions, wherein passages for the cooling medium remain between the joints and/or the elongate joining portions.

It is an object of the present invention to further improve the cooling jacket according to the prior art in terms of the cooling output of the latter as well as in terms of the production method thereof.

This object is achieved according to the invention by a stator, by an electric machine as well as by a motor vehicle having the features according to the respective independent patent claims. Advantageous embodiments of the invention are the subject matter of the dependent patent claims, of the description as well as of the figures.

A stator according to the invention for an electric machine of a motor vehicle comprises a laminated core having an internal side which faces a cavity and which in the circumferential direction has axially extending winding grooves, and having an external side. The stator moreover has windings which are disposed in the winding grooves and on axially opposite end sides of the laminated core configure end windings. The stator furthermore has a cooling jacket which directs a cooling fluid and has a first lamination which configures an internal wall of the cooling jacket that faces the external side of the laminated core, and a second lamination which configures an external wall of the cooling jacket that surrounds the internal wall, wherein one of the laminations is configured without a structure and the respective other lamination is structured having depressions and elevations. The laminations are joined in the region of the depressions and in the region of the elevations configure at least one cooling duct that guides the cooling fluid. Moreover, an axial height of the cooling jacket exceeds an axial height of the laminated core. The cooling jacket thus has a laminated-core cooling-jacket region for encasing and cooling the laminated core, and two axially opposite end-winding cooling-jacket regions which, for encasing and cooling the end windings, are adjacent to the laminated-core cooling-jacket region.

An electric machine for a motor vehicle having a stator according to the invention and a rotor which is rotatably mounted in the cavity of the laminated core of the stator is moreover part of the invention. The electric machine is thus configured as an internal rotor machine and can be used as a traction machine for a motor vehicle which can be electrically driven.

The stator has the laminated core as well as the electrical windings. The laminated core herein has two axially opposite end sides. The laminated core can be hollow-cylindrical, for example, and have annular end sides. The rotor of the electric machine can be rotatably mounted in the cylindrical cavity enclosed by the laminated core, wherein a rotation axis of the rotor corresponds to a longitudinal axis of the laminated core. The laminated core herein on the internal side that faces the cavity has the winding grooves, or stator grooves, respectively, for receiving the windings. The winding grooves are in particular mutually equidistant in the circumferential direction and disposed so as to be distributed across an entire internal circumference of the internal side of the laminated core. The winding grooves extend in the axial direction, from the first end side of the laminated core to the opposite second end side of the laminated core. The windings disposed in the winding grooves protrude in the axial direction, thus along the rotation axis, beyond the laminated core and thereon configure in each case one annular end winding. The windings of the stator can be configured, for example, as profile-bar windings or round-wire windings.

The cooling jacket which is disposed on the external side of the laminated core can be coupled to a cooling circuit of the electric machine that provides the cooling fluid and is thus configured for cooling the stator during the operation of the electric machine. The cooling jacket is configured as a hollow member which in regions has double walls, for example as a double-wall hollow cylinder, and has the two concentrically disposed laminations which are of a substantially hollow-cylindrical shape. One of the laminations herein is configured without a structure, having a smooth surface. For example, the lamination that configures the internal wall can be configured without a structure. The cooling jacket by way of the smooth internal wall can thus be brought to bear across the entire area on the smooth external side of the laminated core. However, the lamination that configures the external wall may also be configured without a structure. The laminated core that supports the winding can thus be particularly well fastened, for example press-fitted, in a housing of the electric machine by way of the cooling jacket.

The respective other lamination has a structure by way of which a shape, or a profile, respectively, of the at least one cooling duct is defined. To this end, the structured lamination, or the lamination provided with the structure, respectively, has the depressions or embossed features, respectively, which protrude in the direction of the lamination without a structure and bear on the lamination without a structure. The two laminations are permanently joined or connected to one another, respectively, in regions of these depressions. Moreover, the lamination provided with a structure has the elevations and projections, respectively, which protrude counter to the direction of the lamination without a structure. The two laminations connected to one another are disposed so as to be spaced apart in these regions and therebetween thus configure a hollow space or a cavity, respectively. This hollow space forms the at least one cooling duct. In the case of the internal wall being configured without a structure and the external wall being provided with a structure, the cooling jacket is configured having at least one external cooling duct, and in the case of the external wall being configured without a structure and the internal wall being provided with a structure, the cooling jacket is configured having at least one internal cooling duct.

The cooling fluid can be directed through this at least one cooling duct along the external side of the laminated core. However, in order for not only the laminated core but also the end windings to be cooled, the cooling jacket is configured having a height which corresponds in particular at least to an overall height of the laminated core having the windings projecting on the laminated core. The overall height herein corresponds to the spacing between the axially outermost points of the end windings. The end windings configure particularly critical regions on the stator since the latter can heat up to a particularly high temperature and in the regions herein can form so-called hotspots. In order to prevent these hotspots negatively influencing an output of the electric machine or even leading to overheating of the electric machine, the end windings are conjointly cooled by means of the cooling jacket. To this end, the laminated core is encased by the, for example, hollow-cylindrical laminated-core cooling-jacket region and the end windings are encased by the, for example, hollow-cylindrical end-winding cooling-jacket regions.

Such a cooling jacket, which cools the laminated core as well as the particularly temperature-critical end windings, advantageously ensures a reliable operation of the electric machine.

The cooling jacket is preferably produced by means of a roll-bonding method. In the roll-bonding method, or in roll-bonding, respectively, the laminations are in regions rolled onto one another and on account thereof connected in regions. The laminations can be separated at locations which are to remain non-connected. The laminations are then inflated, on account of which one lamination in regions is raised in relation to the other lamination, the elevations and depressions being configured herein. Even complex profiles or shapes, respectively, of the cooling ducts, for example meandering cooling ducts, can be formed by such a method. The cooling jacket may however also be produced by means of another forming technique, for example by deep-drawing or hydroforming the laminations and subsequently joining the laminations.

The cooling jacket is particularly preferably configured as a cooling sleeve for disposal on the laminated core, for example for attaching around the laminated core. The cooling jacket thus has an axially extending gap by way of which the diameter of the cooling jacket can be temporarily enlarged for disposal on the laminated core. To this end, ends or edges, respectively, of the cooling jacket that face the gap can be forced apart and the cooling jacket can be pushed axially over the laminated core. In particular, the cooling sleeve has connection means for connecting the mutually facing ends of the cooling sleeve. The ends as the connection means can have suitable closures, for example spring closures, which fasten the cooling jacket on the laminated core by tension in the circumferential direction. The connection means may also be screws. However, it may also be that pipe clips or tensioning straps are used in order for the cooling sleeve to be pressed onto the laminated core. Moreover, the ends can be welded to one another. In the case of the cooling jacket not being configured as a cooling sleeve but being configured so as to be closed, the cooling jacket and the laminated core can be connected to one another by press-fitting or thermal joining.

It can also be provided that the mutually facing ends of the cooling sleeve are angled in the direction of the laminated core, and the external side of the laminated core has an axially extending groove for receiving the angle ends of the cooling sleeve. The ends are thus introduced into the groove such that a connection which is form-fitting in the circumferential direction is created. Particularly exact positioning and positive fixing of the cooling jacket on the laminated core can thus be achieved. The closures on the cooling jacket already mentioned, the pipe clips, or the tensioning straps can be used for further fastening.

In one refinement of the invention, a diameter of the end-winding cooling-jacket regions for reducing a radial spacing from the end windings is at least in regions smaller than a diameter of the laminated-core cooling-jacket region. This embodiment is based on the concept that an external diameter of the laminated core is larger than an external diameter of the annular end windings. In order to improve thermal linking of the cooling jacket, which in the laminated-core cooling-jacket region bears on the external side of the laminated core, to the end windings, the spacing between the end windings and the end-winding cooling-jacket regions is at least in regions reduced by reducing the diameter of the cooling jacket in these regions. To this end, the cooling jacket can be configured, for example, from three axially adjacent hollow-cylindrical regions, wherein the central region configures the laminated-core cooling-jacket region having a first diameter, and the two outer regions configure the end-winding cooling-jacket regions having a second diameter which at least in regions is smaller in comparison to the first diameter.

It proves advantageous when, for thermally linking the end windings to the respective end-winding cooling-jacket region, a thermally conductive filler material, in particular a compound, is disposed between the end windings and the respective end-winding cooling-jacket region. Since the cooling jacket by virtue of the electrically conductive laminations thereof cannot be disposed so as to bear on the end windings, the electrically isolating, thermally conductive filler material, which provides a thermal path between the end windings and the cooling jacket, is used. The filler material encases or surrounds, respectively, the end windings. The respective end-winding cooling-jacket region in this instance bears on the filler material. A particularly efficient dissipation of heat from the end windings to the cooling jacket can thus take place despite the spacing between the end windings and the cooling jacket. Alternatively or additionally, for thermally linking the laminated core to the laminated-core cooling-jacket region, a thermally conductive adhesive is disposed between the laminated core and the laminated-core cooling-jacket region. Additional fixing of the cooling jacket to the laminated core can thus be achieved by the adhesive, and a dissipation of heat from the laminated core to the cooling jacket can simultaneously be improved.

In one embodiment of the invention the depressions are configured in the form of blind holes in the structured lamination. On account thereof, the two laminations are connected to one another at punctiform joints, wherein a substantially hollow-cylindrical cooling duct interrupted in a punctiform manner is configured on account of the elevations. The elevations are thus formed by the region of the lamination provided with a structure that surrounds the depressions in the form of blind holes. Interruptions within the cooling duct at which turbulences are caused in the flowing cooling fluid are formed on account of the punctiform joints. Such a turbulent flow results in a higher cooling output in comparison to a laminar flow which would be caused by an uninterrupted hollow-cylindrical cooling duct.

In another embodiment of the invention, the depressions in the structured lamination are configured in the form of grooves. On account thereof, the two laminations are connected to one another at elongate, axially extending joints that are disposed so as to be distributed in the circumferential direction, wherein tunnel-shaped, axially extending, mutually parallel cooling ducts are configured on account of the elevations. Elongate depressions and elevations are thus disposed in an alternating manner in the circumferential direction in the structured lamination. The depressions and elevations herein extend across at least a height of the laminated-core cooling-jacket region and direct the coolant axially along the external side of the laminated core. U-shaped elevations which connect in each case two neighboring cooling ducts and thus deflect the cooling fluid in the region of an end winding can be configured in one of the end-winding cooling-jacket regions. Such individual tunnel-type cooling ducts ensure a higher flow resistance of the cooling fluid in comparison to a hollow-cylindrical cooling duct, and thus ensure a higher cooling output.

In one refinement of the invention, the lamination that configures the external wall is configured without a structure, and the lamination that configures the internal wall has the elevations that protrude inward in the direction of the laminated core, wherein the external side has cooling grooves which for receiving the elevations correspond to the elevations. The at least one cooling duct is thus configured so as to be internal. The laminated core on the internal side has the winding grooves for receiving the windings, and on the external side has the cooling grooves for receiving the cooling ducts. In the case of the cooling ducts being configured as axially extending tunnels, the cooling grooves are elongate depressions which are disposed so as to be mutually parallel in the circumferential direction across the external side of the laminated core and extend axially across the height of the laminated core. A number, shape, and spacing of the cooling grooves herein may differ from the number, shape, and spacing of the winding grooves. A radial width of the stator can advantageously be kept particularly minor by disposing the elevations of the internal wall in the cooling grooves. Moreover, a smooth external contour of the stator can be formed, by way of which the stator can advantageously be fastened in a form-fitting of force-fitting manner, for example by means of a screw fitting and or a shrink-fit bandage, in a housing of the electric machine.

The cooling jacket preferably has at least one radially outward protruding convexity by way of which a cavity for receiving and cooling at least one further component of the electric machine is formed between the cooling jacket and the external side of the laminated core. The further components of the electric machine, for example housing parts, a shaft bearing, electronic components, lines, etc., can be disposed in the cavity and on account thereof be thermally linked to the cooling jacket. In particular, the at least one convexity extends axially across at least part of the height of the cooling jacket, or is located in the extension of the latter, and between the cooling jacket and the external side of the laminated core configures a tunnel-type cavity between the cooling jacket and the external side of the laminated core for receiving and cooling a component that is formed as a connector line to the windings. The connector lines are thus guided between the external side of the laminated core and the cooling jacket and are cooled on account thereof.

Moreover, the laminated core can have at least one lug-type bulge which extends across the entire height of the laminated core and has one axially continuous opening which configures a screw hole for screw-fitting the stator in a housing of the electric machine, and the cooling jacket can have at least one molding which corresponds to the at least one bulge. A radial width of the laminated core is enlarged in the region of the lug-type bulge. The passage opening through which a screw for firmly screwing the stator in place can be guided runs through this bulge. The cooling jacket has the molding that corresponds to the bulge such that the cooling jacket follows an external contour of the laminated core. The cooling jacket and the laminated core thus have identical cross sections such that the cooling jacket in the laminated-core cooling-jacket region can be brought to bear across the entire area on the external side of the laminated core.

It can be provided that at least one of the end-winding cooling-jacket regions is formed as a fluid-distributor structure for directing the cooling fluid into the at least one cooling duct and/or as a fluid-collector structure for receiving the cooling fluid from the at least one cooling duct, and has a cooling-fluid connector having a fluid inlet for directing the cooling fluid into the fluid-distributor structure, and a fluid outlet for discharging the cooling fluid from the fluid-collector structure. To this end, for example, the at least one cooling duct can be configured only in the laminated-core cooling-jacket region. For example, one of the end-winding cooling-jacket regions can thus be configured as the distributor structure and comprise the fluid inlet. Cooling fluid from the cooling circuit can be directed into the distributor structure by way of the fluid inlet which can be coupled to the cooling circuit, the distributor structure supplying the cooling fluid to the at least one cooling duct. The respective other end-winding cooling-jacket region can be configured as the collector structure and comprise the fluid outlet. In this case, the cooling fluid is directed in the axial direction, wherein the fluid inlet as well as the fluid outlet are disposed on axially opposite peripheries of the cooling jacket.

It can however also be provided that the fluid inlet and the fluid outlet are disposed on the same end-winding cooling-jacket region such that the cooling fluid is directed axially and in the circumferential direction. In this case, the end-winding cooling-jacket region that has the cooling-fluid connector serves as a fluid-distributor and fluid-collector structure, while the respective other end-winding cooling-jacket region comprises sub-regions of the at least one cooling duct. In the case of the axially extending cooling ducts, the cooling fluid is diverted or deflected, respectively, from one cooling duct to a neighboring cooling duct in this end-winding cooling-jacket region, for example. In order for the cooling-fluid connector to be configured, the two laminations on the side thereof that configures the periphery of the cooling jacket in the end-winding cooling-jacket region/regions can be joined at least in regions, wherein the two laminations in the non-joined region are configured so as to be mutually spaced apart and configure the fluid inlet or the fluid outlet, respectively.

A motor vehicle which has an electric machine according to the invention is furthermore part of the invention. The motor vehicle is in particular a motor vehicle in the form of an electric or hybrid vehicle which can be electrically driven, and has the electric machine as the drive machine.

The embodiments presented in the context of the stator according to the invention and the advantages of these embodiments apply in an analogous manner to the electric machine according to the invention as well as to the motor vehicle according to the invention.

Further features of the invention can be derived from the claims, the figures and the description of the figures. The features and combinations of features mentioned above in the description and the features and combinations of features mentioned below in the description of the figures and/or shown in the figures alone can be used not only in the respectively indicated combination but also in other combinations or individually.

The invention will now be explained in more detail by means of the preferred exemplary embodiment as well as with reference to the drawings.

Identical as well as functionally equivalent elements are provided with the same reference signs in the figures.

DETAILED DESCRIPTION OF THE DRAWINGS

Figure 1:
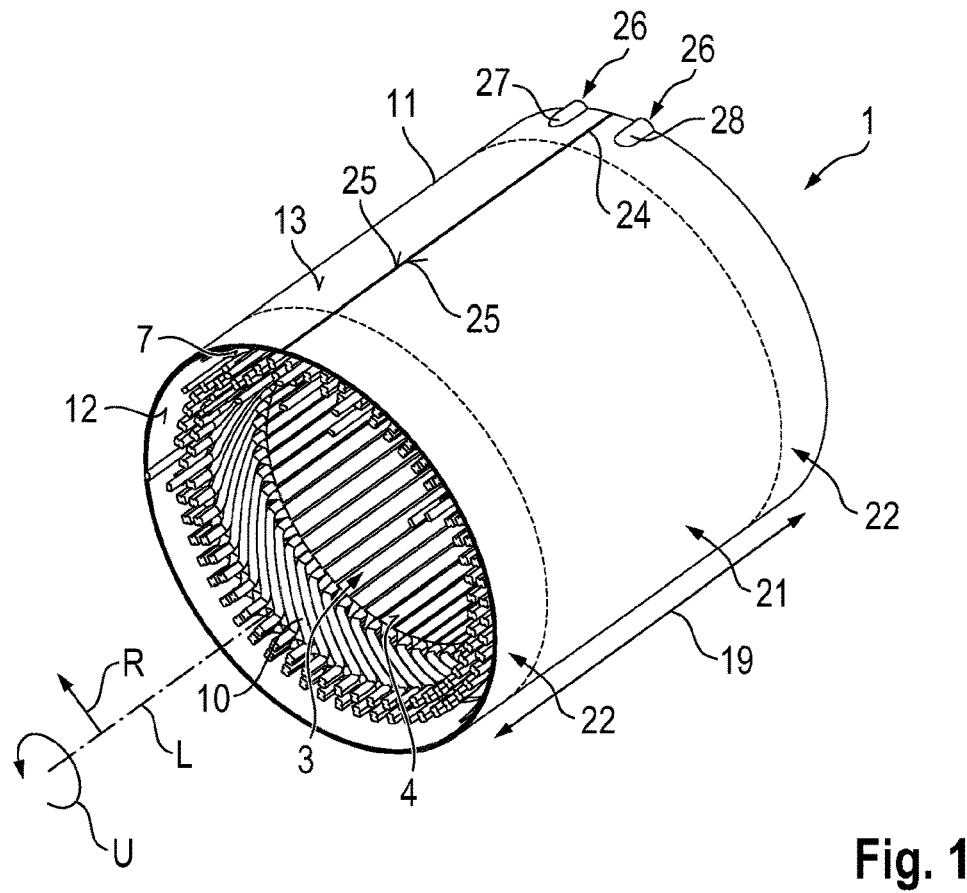
FIG. 1 is a schematic illustration of a first embodiment of a stator of an electric machine, viewed from a first perspective.
Figure 2:
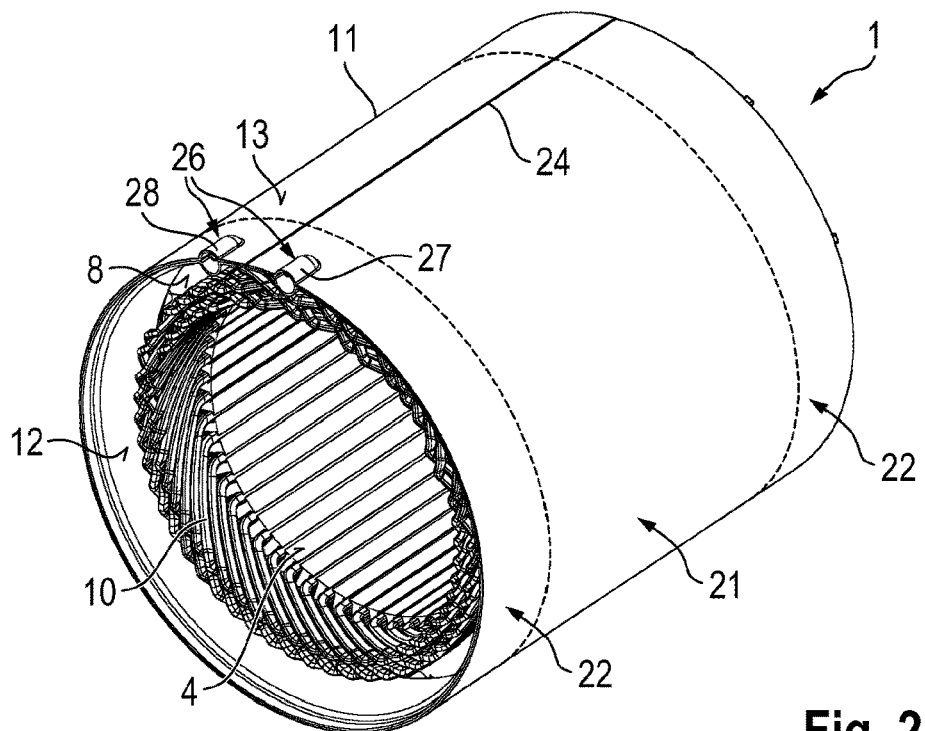
FIG. 2 is a schematic illustration of the stator according to FIG. 1, viewed from a second perspective.
Figure 3:
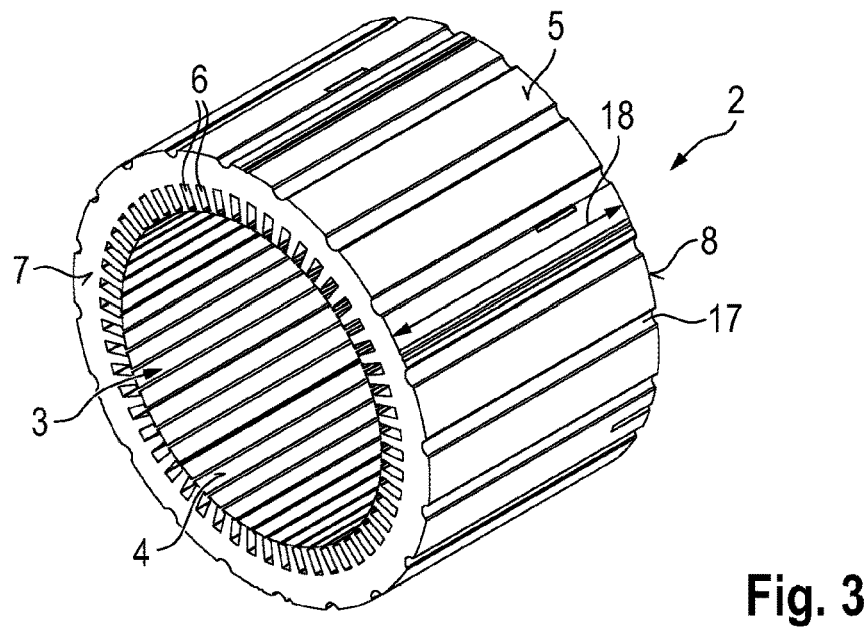
FIG. 3 is a schematic illustration of a laminated core having windings of the stator according to FIG. 1 and FIG. 2.
Figure 4:
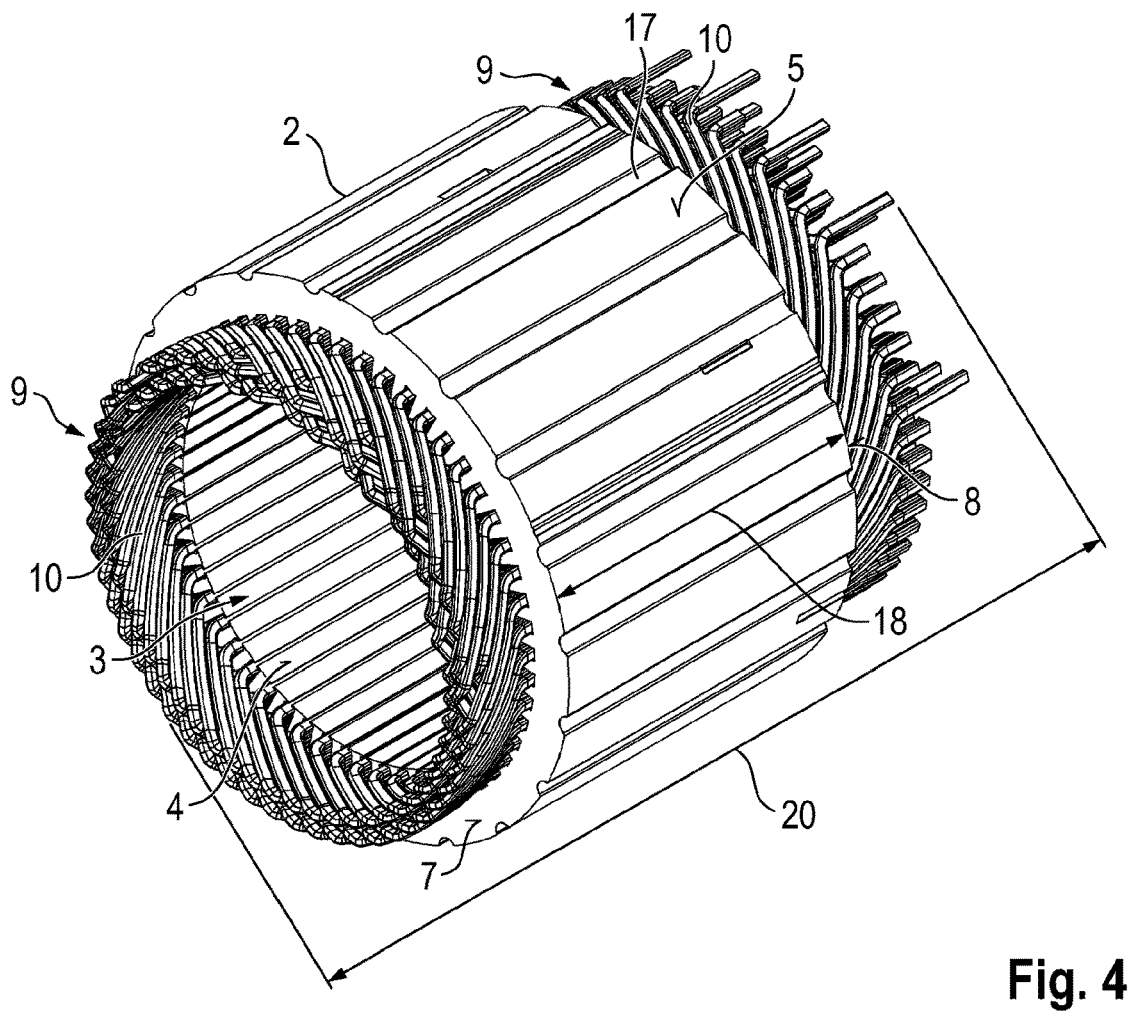
FIG. 4 is a schematic illustration of the laminated core of the stator according to FIGS. 1, 2, and 3.

FIG. 1 and FIG. 2 show a first embodiment of a stator 1 of an electric machine (not shown here) for a motor vehicle which can be electrically driven, viewed from different perspectives. The stator 1 has a laminated core 2 which is shown in an individual illustration in FIG. 3. The laminated core 2 is configured to be hollow-cylindrical and to encircle a longitudinal axis L about a circumferential direction U of the stator 1. The longitudinal axis L also corresponds to a rotation axis about which a rotor (not shown here) which is mounted in a cylindrical cavity 3 of the laminated core 2 rotates. The laminated core 2 has an internal side 4 which defines the cylindrical cavity 3. The laminated core 2 moreover has an external side 5 which, in the radial direction R, is opposite the internal side 4. A plurality of winding grooves 6 are configured so as to be distributed in the circumferential direction U in the internal side 4 of the laminated core 2. The winding grooves 6 extend axially along the longitudinal axis L, from a first end side 7 of the laminated core 2 to a second end side 8 of the laminated core 2 that is axially opposite the first end side 7. Windings 9 of the stator 1 are disposed in these winding grooves 6. The windings 9 here are configured as profile-bar windings. An illustration of the laminated core 2 having the windings 9 is shown in FIG. 4. The windings 9 herein protrude axially beyond the end sides 7, 8 of the laminated core 2 and form end windings 10 thereon.

Figure 5:
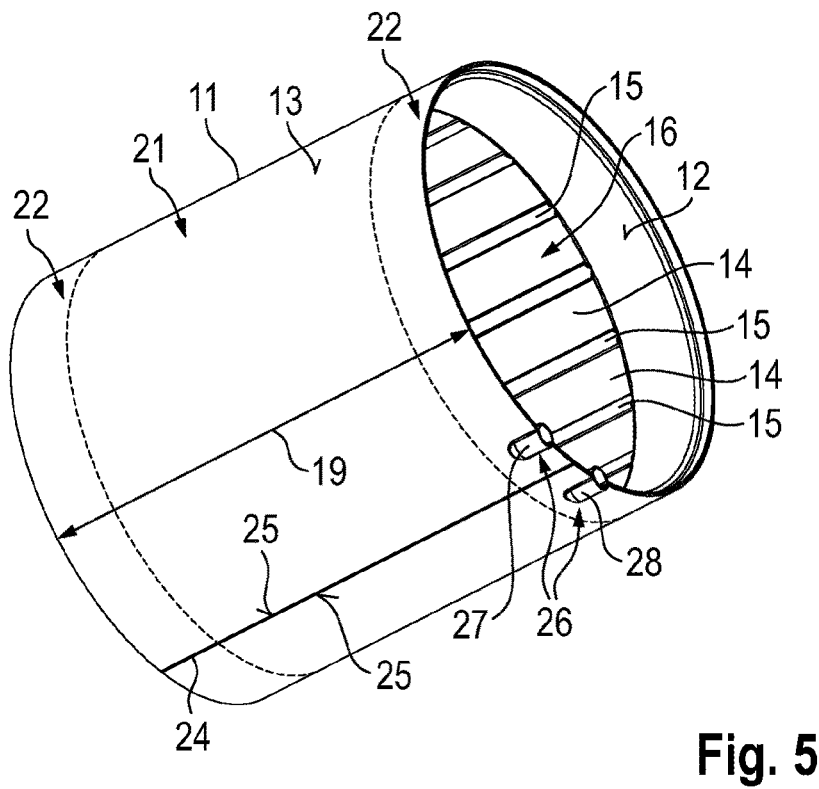
FIG. 5 is a schematic illustration of the cooling jacket of the stator according to FIG. 1 and FIG. 2.

The stator 1 moreover has a cooling jacket 11 which is shown in an individual illustration in FIG. 5. The cooling jacket 11 has a first lamination 12 which forms an internal wall of the cooling jacket 11 and faces the external side 5 of the laminated core 2, and a second lamination 13 which forms an external wall of the cooling jacket 11 and is disposed so as to radially neighbor the internal wall. One of the two laminations 11, 12 herein is configured without a structure and thus has a smooth surface. Here, the second lamination 13 which configures the external wall is configured without a structure and thus forms a smooth external contour of the stator 1. The first lamination 12 here is configured with a structure and has depressions 14 and elevations 15. The laminations 12, 13 are joined and fixedly connected in the region of the depressions 14. The connected laminations 12, 13 in the region of the elevations 15 are disposed so as to be mutually spaced apart and thus configure at least one cooling duct 16 for directing a cooling fluid. The at least one cooling duct 16 here thus protrudes radially inward. In the first embodiment of the stator 1, this stator 1 has a plurality of tunnel-type cooling ducts 16 which run so as to be mutually parallel, extend axially, and are disposed so as to be distributed in the circumferential direction U. The laminated core 2 here, on the external side 5 thereof, for receiving the inward-protruding cooling duct 16 has cooling grooves 17, which in the axial direction extend across an entire height 18 of the laminated core 2. The cooling jacket 11 can thus be joined in a form-fitting manner to the laminated core 2 in that the cooling ducts 16 are disposed in the cooling grooves 17.

Figure 7:
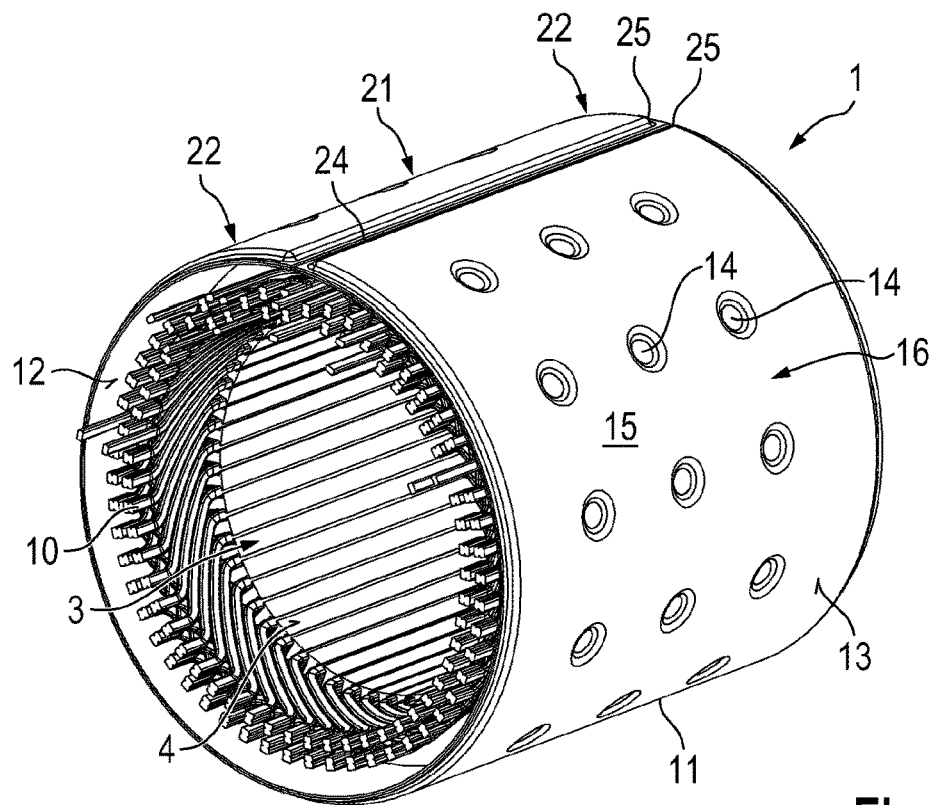
FIG. 7 is a schematic illustration of a second embodiment of a stator of an electric machine, viewed from a first perspective.
Figure 8:
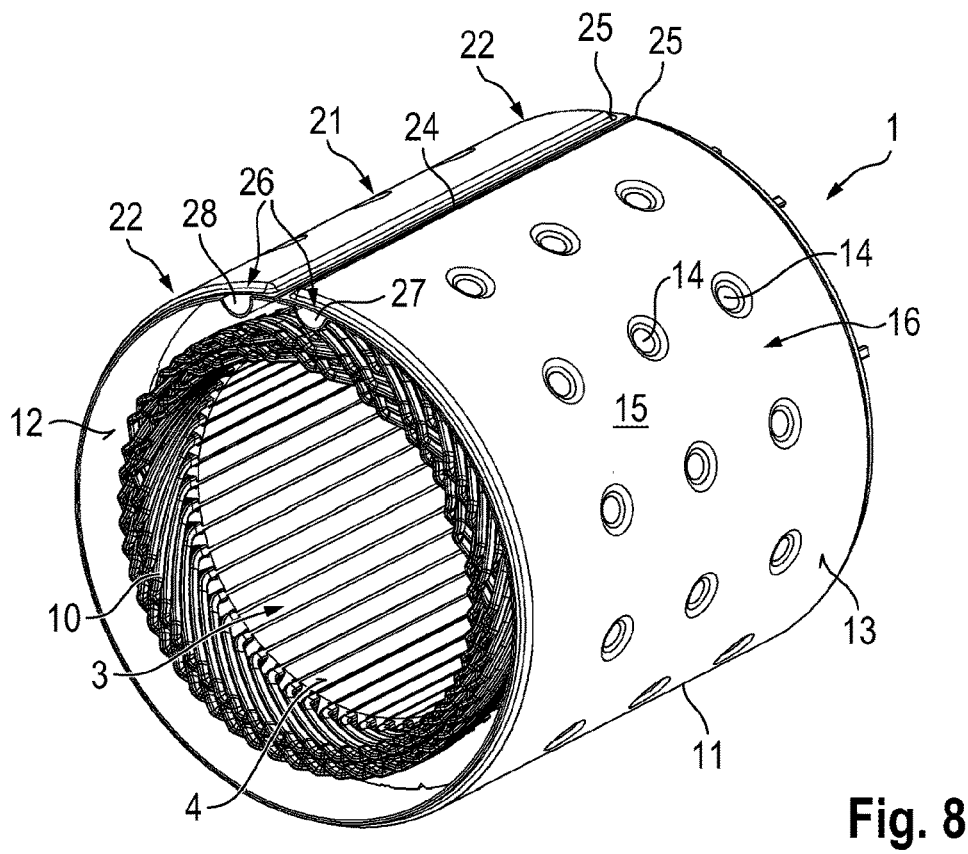
FIG. 8 is a schematic illustration of the stator according to FIG. 7, viewed from a second perspective.

FIG. 7 and FIG. 8 show a second embodiment of the stator 1, viewed from different perspectives. Here, the first lamination 12 which configures the internal wall is configured without a structure, and the second lamination 13 which configures the external wall has the structure of depressions 14 and elevations 15. The depressions 14 here are configured in the form of blind holes such that the first lamination 12 and the second lamination 13 are joined at punctiform joints. The cooling duct 16 formed by the elevations 15 is thus configured so as to be hollow-cylindrical and has punctiform interruptions by which turbulence is are generated in the cooling fluid.

The cooling jacket 11 of the two embodiments of the stator 1 can be produced by roll-bonding, for example. To this end, the two laminations 12, 13 are joined under high pressure when rolling, wherein regions of the laminations 12, 13 are spared or treated with separation means, respectively, such that the laminations 12, 13 cannot connect to one another in these regions. These regions are subsequently "inflated" such that the elevations 15 in the form of the cooling duct 16 can form there. The regions which are not treated with separation means and where the laminations 12, 13 are connected configure the depressions 14.

Figure 6:
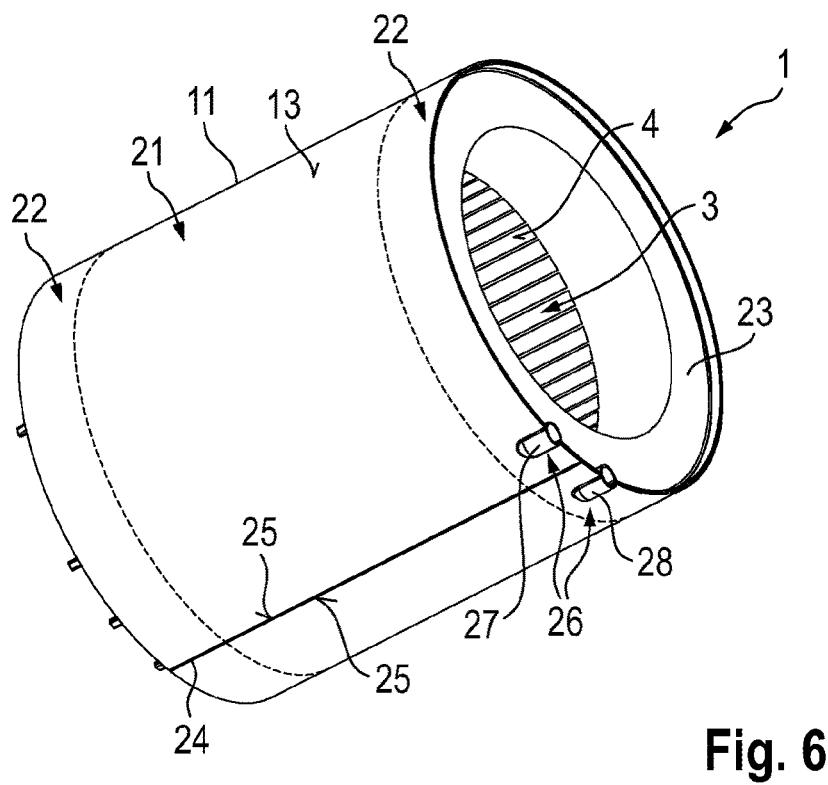
FIG. 6 is a further schematic illustration of the stator according to FIG. 1 and FIG. 2.

The cooling jacket 11 herein has a height 19 which exceeds the height 18 of the laminated core 2. The height 19 of the cooling jacket 11 corresponds in particular to an overall height 20 of the lamination core 2 having the windings 9 (see FIG. 4). The cooling jacket 11 at the end sides 7, 8 thus projects beyond the laminated core 2 and thus has one laminated-core cooling-jacket region 21 and two axially opposite end-winding cooling-jacket regions 22. The first lamination 12 in the laminated-core cooling-jacket region 21 bears on the external side 5 of the laminated core 2. The end-winding cooling-jacket regions 22 encase the end windings 10, wherein the first lamination 12 is disposed so as to be spaced apart from the end windings 10. The end windings 10 here are encased by a compound 23 (see FIG. 6) which is electrically isolating and thermally conductive. The compound 23 thermally links the end windings 10 to the cooling jacket 11. The cooling jacket 11 can be configured as a cooling sleeve, for example. To this end, the cooling jacket 11 has a gap 24, wherein ends 25 of the cooling jacket 11 that are adjacent to the gap 24 can be bent apart in order to be disposed on the laminated core 2. After the cooling sleeve has been disposed on the laminated core 2, the cooling jacket 11 can be fixed to the laminated core 2 by way of closures at the ends 25 by way of tensioning straps, or by way of pipe clips, for example.

The cooling jacket 11 moreover has a cooling-fluid connector 26 having a fluid inlet 27 and a fluid outlet 28. The cooling-fluid connector 26 here is configured in one of the end-winding cooling-jacket regions 22. To this end, a convexity by way of which the laminations 12, 13 are disposed so as to be mutually spaced apart is formed in at least one of the laminations 12, 13, for example. Cooling fluid can be directed into the cooling jacket 11 by way of the fluid inlet 27 herein, and cooling fluid can be discharged from the cooling jacket 11 by way of the fluid outlet 28. The end-winding cooling-jacket region 22, which here has the fluid inlet 27 as well as the fluid outlet 28, here serves as a fluid-distributor and fluid-collector structure. Fluid is directed into the at least one cooling duct 16 by way of the fluid-distributor structure which is fluidically coupled to the fluid inlet 27, and the cooling fluid that has been directed through the at least one cooling duct 16 is collected again in the fluid-collector structure which is fluidically coupled to the fluid outlet 28. The cooling fluid here is directed in an axial and in the circumferential direction U through the at least one cooling duct 16 along the laminated core 2 and along the end windings 10.

Figure 9:
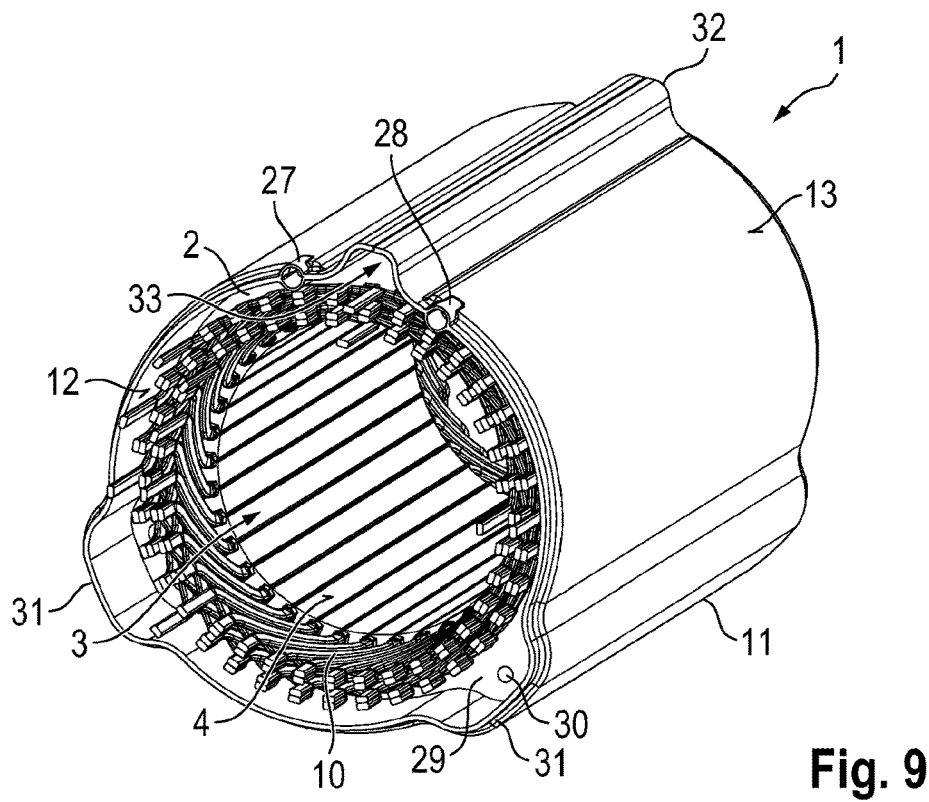
FIG. 9 is a schematic illustration of a third embodiment of a stator of an electric machine, viewed from a first perspective.
Figure 10:
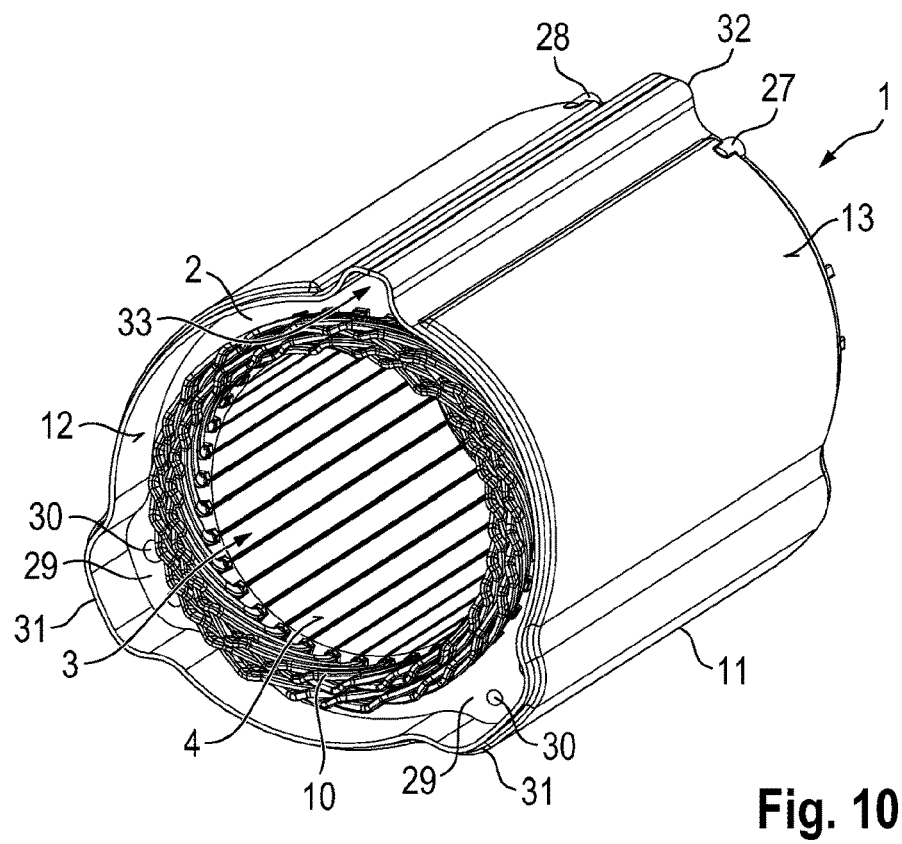
FIG. 10 is a schematic illustration of the stator according to FIG. 9, viewed from a second perspective.
Figure 11:
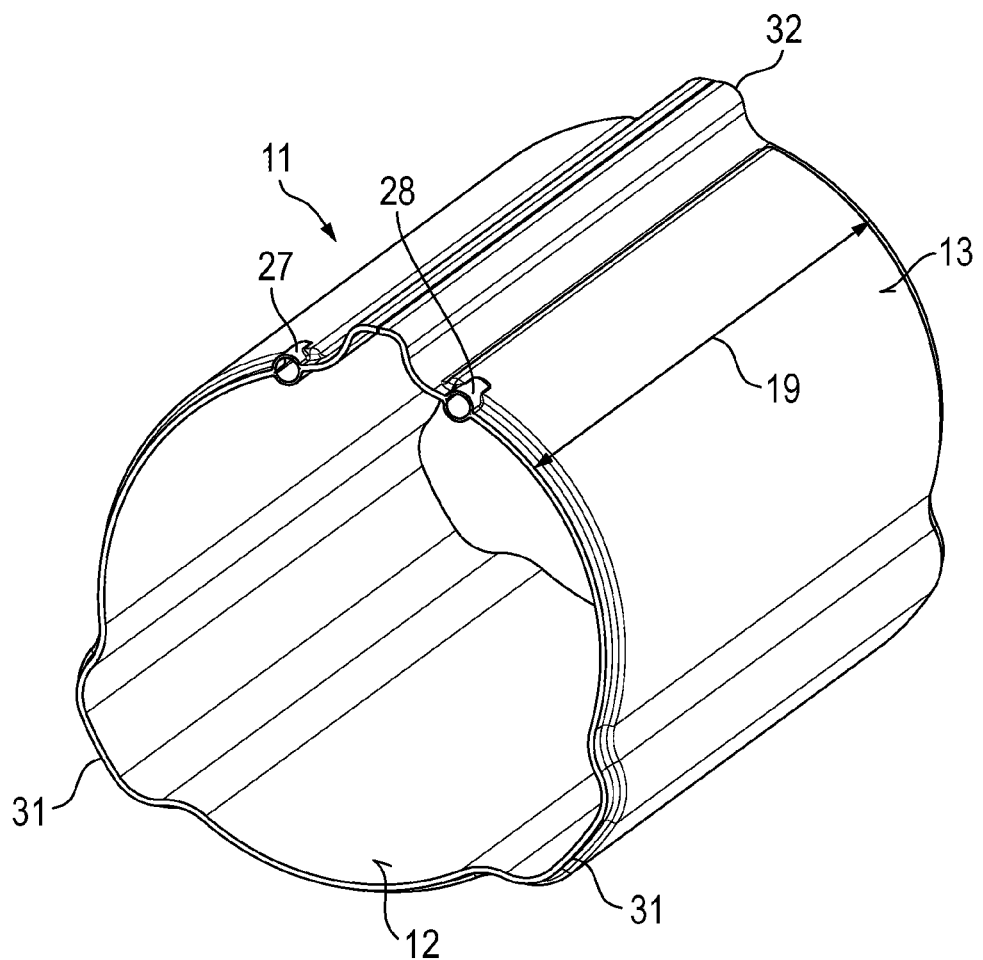
FIG. 11 is a schematic illustration of a cooling jacket of the stator according to FIG. 9 and FIG. 10.

FIG. 9 and FIG. 10 show a third embodiment of the stator 1. The laminated core 2 here has two lug-type bulges 29 by way of which a radial width of the laminated core 2 is enlarged in regions. These bulges 29 have axially continuous openings 30 which configure screw holes for screw-fitting the stator 1 in a housing of the electric machine. The cooling jacket 11, which here is shown without the elevations 15 and the depressions 14 in a separate illustration in FIG. 11, has moldings 31 which correspond to the bulges 29 and extend axially across the entire height 19 of the cooling jacket 11 and are configured for receiving the bulges 29 of the laminated core 2. Moreover, the cooling jacket 11 here has a radially outward protruding convexity 32, on account of which a tunnel-type cavity 33 here is formed between the laminated core 2 and the cooling jacket 11. Connector lines to the windings 9 of the stator 1 can be disposed in and cooled in this cavity 33, for example.

List of reference signs
1 Stator
2 Laminated core
3 Cavity
4 Internal side
5 External side
6 Winding groove
7 First end side
8 Second end side
9 Windings
10 End windings
11 Cooling jacket
12 First lamination
13 Second lamination
14 Depressions
15 Elevations
16 Cooling ducts
17 Cooling grooves
18 Height of the laminated core
19 Height of the cooling jacket
20 Overall height
21 Laminated-core cooling-jacket region
22 End-winding cooling-jacket regions
23 Compound
24 Gap
25 Ends
26 Cooling fluid connector
27 Fluid inlet
28 Fluid outlet
29 Bulge
30 Opening
31 Molding
32 Convexity
33 Cavity
L Longitudinal axis
U Circumferential direction
R Radial direction.

What is claimed is:

1. A stator for an electric machine of a motor vehicle, comprising:
a laminated core having an internal side which faces a cavity and, along a circumferential direction, has axially extending winding grooves, and having an external side;
windings which are disposed in the winding grooves and, on axially opposite end sides of the laminated core, configure end windings; and
a cooling jacket which directs a cooling fluid and has a first lamination which configures an internal wall of the cooling jacket that faces the laminated core, and a second lamination which configures an external wall of the cooling jacket that surrounds the internal wall, wherein
one of the laminations is configured without a structure and the respective other lamination is structured with depressions and elevations,
the laminations are joined in a region of the depressions and, in a the region of the elevations, configure at least one cooling duct that guides the cooling fluid,
an axial height of the cooling jacket exceeds an axial height of the laminated core,
the cooling jacket has a laminated-core cooling-jacket region for encasing the laminated core, and two axially opposite end-winding cooling-jacket regions which, for encasing the end windings, are adjacent to the laminated-core cooling-jacket region, the cooling jacket has at least one radially outward protruding convexity by way of which a cavity for receiving and cooling at least one further component of the electric machine is formed between the cooling jacket and the external side of the laminated core, and the convexity extends axially across at least part of the height of the cooling jacket, or is located in an extension of the cooling jacket, and between the cooling jacket and the external side of the laminated core configures a tunnel-type cavity for receiving and cooling a component that is formed as a connector line to the windings.

2. The stator according to claim 1, wherein the cooling jacket is configured as a cooling sleeve for disposal on the laminated core.

3. The stator according to claim 2, wherein mutually facing ends of the cooling sleeve defined by an axial gap are angled in a direction of the laminated core, and the external side of the laminated core has an axially extending groove for receiving the angled ends of the cooling sleeve.

4. The stator according to claim 3, wherein the cooling sleeve has a connector for connecting mutually facing ends of the cooling sleeve.

5. The stator according to claim 1, wherein a diameter of the end-winding cooling-jacket regions for reducing a radial spacing from the end windings is at least, in regions, smaller than a diameter of the laminated-core cooling-jacket region.

6. The stator according to claim 1, wherein at least one of:

for thermally linking the end windings to the respective end-winding cooling-jacket region, a thermally conductive filler material is disposed between the end windings and the respective end-winding cooling-jacket region, and for thermally linking the laminated core to the laminated-core cooling-jacket region, a thermally conductive adhesive is disposed between the laminated core and the laminated-core cooling-jacket region.

7. The stator according to claim 1, wherein the cooling jacket is a roll-bonded cooling jacket.

8. The stator according to claim 1, wherein the depressions are configured as blind holes, and the two laminations are connected to one another at punctiform joints, wherein a hollow-cylindrical cooling duct interrupted in a punctiform manner is configured on account of the elevations.

9. The stator according to claim 1, wherein the depressions are configured as grooves, and the two laminations are connected to one another at elongate, axially extending joints that are distributed in the circumferential direction, wherein tunnel-shaped, axially extending, mutually parallel cooling ducts are configured on account of the elevations.

10. The stator according to claim 1, wherein the second lamination that configures the external wall is configured without a structure, and the first lamination that configures the internal wall has elevations that protrude inward in the direction of the laminated core, wherein the external side of the laminated core has cooling grooves which for receiving the elevations correspond to the elevations.

11. The stator according to claim 1, wherein the laminated core has at least one lug-type bulge which extends across the entire height of the laminated core and has at least one axially continuous opening which configures a screw hole for screw-fitting the stator in a housing of the electric machine, and the cooling jacket has at least one molding which corresponds to the at least one lug-type bulge.

12. The stator according to claim 1, wherein at least one of the end-winding cooling-jacket regions is formed as a fluid-distributor structure for directing the cooling fluid into the at least one cooling duct and/or as a fluid-collector structure for receiving the cooling fluid from the at least one cooling duct, and has a cooling-fluid connector having a fluid inlet for directing the cooling fluid into the fluid-distributor structure, and a fluid outlet for discharging the cooling fluid from the fluid-collector structure.

13. An electric machine for a motor vehicle comprising:

a stator according to claim 1; and a rotor which is rotatably mounted within the stator.

14. A motor vehicle comprising an electric machine according to claim 13.

* * * * *